(12) United States Patent
Grey et al.

(10) Patent No.: US 8,747,999 B2
(45) Date of Patent: Jun. 10, 2014

(54) CAPSULES

(75) Inventors: Bryan David Grey, Bradford (GB);
Kishor Kumar Mistry, Bradford (GB);
Chun-tian Zhao, Pudsey (GB)

(73) Assignee: BASF SE, Ludwigshafen (DE)

( * ) Notice: Subject to any disclaimer, the term of this patent is extended or adjusted under 35 U.S.C. 154(b) by 1024 days.

(21) Appl. No.: 12/085,270

(22) PCT Filed: Nov. 20, 2006

(86) PCT No.: PCT/EP2006/068664
§ 371 (c)(1),
(2), (4) Date: May 20, 2008

(87) PCT Pub. No.: WO2007/063001
PCT Pub. Date: Jun. 7, 2007

(65) Prior Publication Data
US 2009/0155195 A1    Jun. 18, 2009

(30) Foreign Application Priority Data

Nov. 29, 2005  (EP) ..................................... 05111412

(51) Int. Cl.
| | | |
|---|---|---|
| *B32B 5/16* | (2006.01) | |
| *B32B 15/02* | (2006.01) | |
| *B32B 17/02* | (2006.01) | |
| *B32B 19/00* | (2006.01) | |
| *C08K 9/00* | (2006.01) | |
| *C08K 9/10* | (2006.01) | |
| *C08K 9/12* | (2006.01) | |
| *C07D 251/40* | (2006.01) | |
| *C07D 253/00* | (2006.01) | |
| *C07D 251/54* | (2006.01) | |

(52) U.S. Cl.
USPC .................. 428/402; 428/402.2; 428/402.21;
428/402.24; 428/403; 523/200; 523/208;
523/210; 514/187; 514/241; 544/180; 544/194;
544/196

(58) Field of Classification Search
USPC ......... 510/101, 298, 300, 302, 320, 349, 361,
510/392, 434, 438, 441, 443, 452, 476;
523/200, 208, 210; 524/81, 91, 354,
524/355; 514/187, 241; 544/180, 194, 196
See application file for complete search history.

(56) References Cited

U.S. PATENT DOCUMENTS

| | | | | |
|---|---|---|---|---|
| 6,329,057 | B1 * | 12/2001 | Dungworth et al. .......... | 428/403 |
| 6,833,406 | B1 | 12/2004 | Green et al. ................. | 524/588 |
| 6,849,591 | B1 * | 2/2005 | Boeckh et al. ............... | 510/475 |
| 2003/0171246 | A1 | 9/2003 | Boeckh et al. ............... | 510/475 |
| 2004/0136933 | A1 * | 7/2004 | Mistry et al. ................ | 424/63 |

FOREIGN PATENT DOCUMENTS

| | | |
|---|---|---|
| EP | 1637188 | 3/2006 |
| WO | 01/62376 | 8/2001 |
| WO | 2005/059079 | 6/2005 |

* cited by examiner

*Primary Examiner* — Jane C Oswecki
(74) *Attorney, Agent, or Firm* — Shiela A. Loggins

(57) ABSTRACT

The present invention related to (micro-or nano-) capsules that have two different functional groups on the outer shell of the particles that allow deposition onto the textile surfaces (i.e. exhibit substantivity) and subsequent covalent bonding of the particles onto the textile (i.e. are reactive towards the fiber).

12 Claims, No Drawings

CAPSULES

Modern textiles have to meet high specification and demands for things such as ease of cleaning or ease of ironing. In order to do this, the material is typically functionalized during manufacture by the addition of treatment agents such as silicones etc.

One potential that has been recognized as consumer desirable is for the fabric to possess functionality that provides added freshness either by malodor suppression or by the controlled release of fragrance.

This functionalization can be done at a number of stages during the production method and by a number of well known application techniques such as padding. Alternatively, the agent can be added during an established production stage such as dyeing. The exact mode and point of addition in the production process depends on the type of agent being used.

One means of functionalizing textiles to modify their deodorizing effect is to use modifying materials such as β-cyclodextrin. Such an approach is covered in U.S. Pat. No. 6,861,520 where a crosslinking agent (typically an imidazolidone) is used to attach the cyclodextrin to the fiber. This document teaches that this modified fiber is then able to trap odors.

In a similar vein, the attachment of microcapsules is an established technique as shown in WO 03/093571 and U.S. Pat. No. 4,882,220 where in both cases the method of adhering a capsule to the fiber with the aid of a binder is exemplified.

In terms of use these approaches have a number of disadvantages. Firstly the use of high levels of binder can cause a deterioration in the handle of a fabric leading to a consumer perceptible loss in softness and hence a loss in desirability. Secondly, in terms of odor manipulation, the use of cyclodextrin is limited by the fact that the cyclodextrin molecule can only absorb a very low level of odor components i.e. when in use the payload that they possess is low.

The present invention relates to capsules, which are in the micro- (or nano-) range and seek to overcome these limitations by having cationic and fiber-reactive groups on the outside of the surface of the polymeric shell thus removing the explicit need for a binder and increasing the available payload.

Nano- and microcapsules afford a convenient means of holding materials in readiness for subsequent use. The capsules can have a wide range of morphologies ranging from distinct core-shell to matrix, though other possible morphologies are described in Microspheres, microcapsules and liposomes (Ed R Arshady, Citrus Press 1999 ISBN: 0953218716). Where the morphology is core-shell, the shell encloses the core material of the capsule whereas in the case of matrix types the active material is dispersed throughout the polymeric material.

In use, the encapsulated material retains its properties until the article to which they are applied is used. The retained material can be any kind of active ingredient in any kind of physical form and which can be used in many fields of applications.

The microcapsules of the present invention are characterized in that they have two different functional groups on the outer shell of the particles that allow deposition onto the textile surfaces (i.e. exhibit substantivity) and subsequent covalent bonding of the particles onto the textile (i.e. are reactive towards the fiber).

We have designed these two distinct component features to allow the microcapsules to be introduced and fixed to the textiles at either the exhaust or the padding process stages without the need of polymeric binders. In addition, the novel microcapsules made by this invention are wash durable and retain their activity after a number of wash cycles.

Therefore, the present invention relates to a capsule, which in the micro- or nano range is characterized by the fact that it has cationic and fiber-reactive groups on the outside of the capsule surface.

For a microcapsule, two of the main considerations are the nature of the release to be employed and the surface properties. The type of release achievable with a specific capsule type depends upon the nature of the active, the stresses placed upon the microcapsule and the encapsulating material(s). The enveloping material can be impermeable, permeable or semi permeable. These characteristics can be achieved by the correct choice of the polymeric material as well as other factors such as the level of crosslinker. Therefore there are many possibilities of how to release the core material, if that is the mode of action desired. Some of the possibilities are detailed below with others being detailed by Arshady.

For example, the release of the core material of a capsule with an impermeable shell can be carried out by the destruction of the shell. This can be carried out by direct mechanical means from the outside or by non-mechanical means such as the application of heat.

The release of the core material of a capsule with a semi permeable shell can be carried out by osmotic pressure Release of the active from a permeable microcapsule is via transport through the microcapsule and subsequent removal from the capsule surface.

Typically in the present invention is a microcapsule, having a core containing the active ingredient within a polymeric shell.

In the case of capsule described in this invention, the surface possesses both fiber reactive and substantive groups. The fiber reactive groups as well as the cationic groups can be incorporated into the polymeric shell by choosing suitable monomeric (or oligomeric or polymeric) compounds wherein these groups are already present or the groups can be introduced after the polymerization by treating the shell with suitable compounds. A combination of both methods is also possible.

The cationic groups can be any kind of cationic group. Preferred ones are ammonium groups.

For example, these groups can be incorporated by short-chained, quaternary ammonium compounds, such as diallyl dialkyl ammonium salts (for example diallyl dimethyl ammonium chloride=DADMAC), trihydroxyethylmethyl ammonium methosulfate, and alkyltrimethylammonium chloride. Similarly, the ammonium group can be derived from the polymerization of a cationic vinyl monomer that incorporates a quaternary ammonium group such as a $C_4$-$C_8$ halide quaternized dimethylamino ethyl (meth)acrylate. Alternatively, the polymer can be in free base form and becomes cationic upon acidification. The fiber reactive groups are known from the literature. The characteristic of a fiber reactive group is that they form covalent bonding with the functional group of the fiber. By "textile-reactive" is meant that the payload particle will form a strong chemical bond with the fiber, yarn, fabric, textile, finished goods (including apparel), or other web or substrate to be treated. The functional groups of the fibers are usually hydroxy-, amide- or amino-groups.

The fiber reactive group can have one or more reactive sites (anchors).

Preferred fiber reactive groups are: methyl groups; 2,4-dichloro-1,3,5-triazine (DCT); mono-chlorotriazine (MCT), wherein the triazine can be additionally substituted by one substituent chosen form the group consisting of —F, —OH, —OC$_1$-C$_4$alkyl, —NH$_2$, —NH(C$_1$-C$_4$alkyl) or —N(C$_1$-C$_4$alkyl)$_2$; mono-fluorotriazine, wherein the triazine can be additionally substituted by one substituent chosen form the group consisting of —F, —OH, —OC$_1$-C$_4$alkyl, —NH$_2$, —NH(C$_1$-C$_4$alkyl) and/or —N(C$_1$-C$_4$alkyl)$_2$2-sulfooxyethylsulfonyl group; 2-chloroethylsulfonyl; vinylsulfonyl group; alkoxychlorotriazine; or the 2-(sulfothio)ethylsulfonyl groups; trichloropyrimidine; difluorochloropyrimidine (DFCP); dichloroquinoxaline, 2,3-dichloro-chinoxaline (DCC) and 3-chloropropionamine (CPA).

The textile-reactive hooks or functional groups on the surface of the textile-reactive nanoparticles are selected from those groups that will bind chemically with a particular structural element, fiber, yarn, paper, fabric, or finished good. For example, all cellulosic-based webs contain hydroxyl groups. Wool and other proteinaceous animal fibers, silk, and regenerated proteins contain hydroxyl, amine, carboxylate, and thiol groups (the latter as disulfides). It is desirable for the reactive monomers to contain functional groups that are reactive to the fiber. For example, the reactive monomers may contain adjacent carboxyl groups that can form five- and six-membered cyclic anhydrides. The anhydrides form with the aid of a catalyst when the reactive monomer is heated and dried. These cyclic anhydrides react with fibers that contain hydroxyls or amines (e.g. cotton or wool). Alternatively, the reactive groups may contain epoxide groups or epoxide precursors, such as halohydrins. Epoxides can react with amines and hydroxyls. Also, methylol acrylamide (methylol groups are known to react with cotton, e.g. DMDHEU) may be copolymerized into the nanoparticle matrix.

Specific amine-reactive groups include isothiocyanates, isocyanates, acyl azides, N-hydroxysuccinimide esters, sulfonyl chlorides, aldehydes, glyoxals, epoxides, oxiranes, carbonates, arylating agents, imidoesters, carboxylmides, anhydrides, and halohydrins. Carboxylate-reactive groups include diazoalkanes and diazoacetyl compounds, carbonyl diimidazole, and carboxylmides. Hydroxyl-reactive functional groups include epoxides, oxiranes, carbonyl diimidazole, N,N'-disuccinimidyl carbonate or N-hydroxysuccinimidyl chloroformate, alkyl halides, isocyanates, and halohydrins. Hydroxyl groups may also be oxidized enzymatically or with periodate. Thiol groups react with haloacetyl and alkyl halide derivatives, maleimides, aziridines, acryloyl derivatives, arylating agents, and thiol-disulfide exchange reagents such as pyridyl disulfides, disulfide reductants, and 5-thio-2-nitrobenzoic acid.

The ratio of cationic groups on the surface to the reactive fiber groups on the surface of the polymeric shell is 50:1 up to 1:1, preferably 40:1 up to 2:1.

The polymeric shell can also comprise further non-ionic and/or anionic monomer units.

Suitable non-ionic monomers are for example acrylamide, methacrylamide, N,-dialkylacrylamides, N,N,-dialkylacrylamides, N-vinyl pyrrolidone and water soluble hydroxy-substituted acrylic or methacrylic esters.

Suitable anionic monomers are acrylic acid, methacrylic acid and their alkali metal and ammonium salts, 2-acrylamido-2-methyl-propanesulfonic acid and its salts, sodium styrene sulfonate and the like.

The polymeric shell can also be crosslinked. Suitable crosslinkers are monomers that have at least two nonconjugated monoethylenic double bonds in the molecule. Examples of compounds of this type are acrylic and methacrylic esters derived from dihydric alcohols containing 2 to 24 carbon atoms, e.g. ethylene glycol diacrylate, ethylene glycol dimethacrylate, propylene glycol dimethacrylate, 1,4-butanediol diacrylate, 1,4-butanediol dimethacrylate, 1,6-hexanediol diacrylate and 1,6-hexanediol dimethacrylate, divinylbenzene, methallylmethacrylamide, allyl methacrylate, allyl acrylate, methylenebisacrylamide, trimethylolpropane triacrylate, trimethylolpropane trimethacrylate, pentaerytliritol triallyl ether, pentaerytritol tetraacrylate and pentaerythritol tetramethacrylate. Preferably, crosslinkers may be present up to 80% by weight of the monomer mixture employed for the polymerization.

The cross linkers have the effect that the (micro) capsule walls do not dissolve completely in aqueous bases, but only swell to a greater or lesser extent, on exposure thereto.

Generally, the polymeric shell has a molecular weight of up to 500,000 (determined by GPC using the industry standard parameters). Preferably, the molecular weight is between 30,000 and 100,000. When the polymeric shell is modified and/or (highly) crosslinked the molecular weight can be significantly higher.

The outer surface of the polymeric shell can be modified after the polymerisation if modifiable groups exist.

The core material can be any kind of active ingredient in any kind of physical form and which can be used in many applications.

For example the core is a solid or liquid compound.

For instance the capsule possesses within the matrix secondary polymer particles that are capable of absorbing and retaining active materials.

For example, the core material can be one or more active ingredient selected from the group consisting of UV absorbers, UV reflectors, active dye tracer materials, enzymes, detergent builders, bioactive or anti-microbial/fungal agents, antistats, drugs and pharmaceuticals, sunblock agents, dyes (such as iridescent dyes, fixed dyes, and dyes that respond to a particular environmental or chemical trigger such as heat, pH, carbon monoxide, sulfuric acid, or minute quantities of blood, for example), pigments, colorants, scents and fragrances, fire retardant or suppressant chemicals, metallic reflector colloids, reflective particles (such as mica), magnetic particles, thermochromic materials, insect repellents, heat-absorbing or -releasing phase change agents, bleach catalysts, bleach activators, emollients, fabric softeners, zeolites and activated carbon.

Usually the active ingredient is distributed evenly throughout the matrix in the capsule.

In one embodiment of the invention, the shell of the (micro) capsule as a proportion of the total weight of (micro)capsule and contents is from 1 to 50% by weight, preferably 1 to 30% by weight, particularly preferably 2 to 20% by weight, based on the total weight of the capsule.

The size of the inventive capsule is from 10 nm to 200 µm, preferably, from 100 nm to 100 µm, more preferably from 100 nm to 50 µm.

The average particle size of the capsule is determined by a suitable particle size analyzer such as those made by Coulter (Beckman Coulter, Inc USA) or Sympatec (Sympatec GmbH, Germany).

The capsules according to the invention can be used in powder form or they can be formulated as a liquid formulation. The liquid formulation can be a non-aqueous formulation as well as an aqueous formulation.

A further aspect of the invention is a material prepared using capsules as described above with a formulation as described above.

Preferably the material are fibers, yarns, fabrics, textiles, paper or finished goods (encompassed herein under the terms "textiles" and "webs") treated with the inventive (nano)capsules.

Such textiles or webs exhibit a greatly improved retention of the payload and its activity. By "greatly improved" is meant that the payload encapsulated in a (nano)capsule will remain on the web and its activity will be retained to a greater degree than the payload alone, even after multiple washings. For example, where the payload is a dye, the treated textiles or webs exhibit a greatly improved colorfastness and resistance to fading. When the payload is a reflective material, the textile exhibits a durable reflective or pearlescent sheen or shininess, dependent upon the size of the nanoparticle. Textiles or webs treated with (nano)capsules containing a sunblock agent as the payload will absorb, block, reflect or otherwise prevent or substantially prevent harmful UV radiation from passing through the textile and also will not harm the textile itself. When the payload is an anti-microbial/fungal agent, a drug, a pharmaceutical or an enzyme, the bioactive agents are depleted only by programmed release from the (nano)capsules and not from unintended detachment or release of the particles themselves from the web. This is due to the durability of the chemical bonds between the fibbers and the functional groups of the (nano) capsules.

The production of the capsule can be carried in accordance with known methods, such as disclosed for Example in U.S. Pat. No. 6,833,406.

The following examples describe certain embodiments of this invention, but the invention is not limited thereto. It should be understood that numerous changes to the disclosed embodiments could be made in accordance with the disclosure herein without departing from the spirit or scope of the invention. These examples are therefore not meant to limit the scope of the invention. Rather, the scope of the invention is to be determined only by the appended claims and their equivalents. In these examples all parts given are by weight and the temperatures are given in degree Celsius unless otherwise indicated.

EXAMPLE 1

This example illustrates the preparative method of making matrix polymeric particles having both cationic groups and reactive groups on the outer surfaces.

An aqueous phase is prepared comprising of 300 g of 40% aqueous solution of diallyl dimethyl ammonium chloride and acrylamide copolymer (Ciba Salcare Super 7), 80 g water, 12 g of 70% melamine formaldehyde resin (ex-BIP, Beetle® Resin PT-336) and 2 g of carbon black powder. This aqueous mixture is adjusted to pH 2.0 with 10% sulphuric acid.

The above aqueous phase is added to an oil phase comprising of 400 g of hydrocarbon solvent and 80 g of 20% amphipathic polymeric stabiliser under a high shear Silverson mixer. The mixture is homogenised for 20 minutes maintaining the temperature of the water-in-oil emulsion below 30° C. The resulting emulsion contains aqueous droplets having a mean particle size of 4 microns. The size is determined by a Sympatec particle analyser (R1 lens/Quixcell/Water carrier phase).

The water-in-oil emulsion is then transferred to a 700 ml reaction flask immersed in a water bath. Next, the emulsion is heated to 80° C. under mechanical agitation and maintained at this temperature for further 4 hour. This heat treatment leads to microcapsule formation by an aminoplast polycondensation process. The formed microcapsule slurry is hydrocarbon solvent is then subjected to vacuum distillation to remove the water from the microcapsules. After distillation, the dried microcapsules slurry in hydrocarbon solvent is filtered to remove the solvent and the microcapsule dried to form a dried product.

The resulting 4-micron size microcapsules contain carbon black pigment marker in the inner core with a melamine formaldehyde polymer capsule shell having cationic groups from the DADMAC moiety of the copolymer and reactive methylol groups from the melamine formaldehyde resin.

EXAMPLE 2

This example illustrates the method of making microcapsules as Example 1 with the cores having polymeric latex particles with imbibed fragrances An aqueous phase is prepared comprising 300 g of 40% Ciba Salcare Super 7®, 180 g water, 40 g of 35% polyisobutyl methacrylate emulsion, 4 g Eugenol, 24 g Beetle® resin PT336 and 5 g carbon black pigment. The resulting aqueous phase is adjusted to pH 4.0 with addition of 85% formic acid.

The above aqueous phase is homogenized into an oil phase comprising of 560 g hydrocarbon solvent, 30 g of 20% amphipathic polymeric stabilizer and 5 g of emulsifier (Ex-ICI, Arlacel 83®) to form the water-in-oil emulsion using a laboratory homogeniser. The resulting emulsion is transferred to a 1-litre reaction flask and warmed to 55° C. under mechanical agitation. The mixture is maintained at 55° C. for 6 hours to complete the capsule shell forming reaction. After, the mixture is cooled to room temperature and the microparticles filtered under suction to yield a damp cake of microparticles.

The formed microparticles have the same surface chemistries as product of example 1 except the cores contain an aqueous emulsion of polyisobutyl methacrylate having Eugenol fragrance.

EXAMPLE 3

This example shows the method of making microcapsules with the reactive-substantive features by an oil-in-water encapsulation method.

An aqueous phase is prepared by mixing 50.5 g of 40% Ciba Salcare Super 7®, 50 g de-ionised water and 5.4 g Beetle® Resin PT 336. The pH of the solution is adjusted to 3.2 using 85% formic acid. Then, the solution is stirred at room temperature until it becomes slightly hazy. This aqueous mixture is subsequently warmed in a water bath to about 35° C.

Separately an oil phase is prepared from 100 g of Kenwax K19®. This wax phase is then added to the above aqueous phase under a high shear mixer (Laboratory Silverson homogeniser) to form molten wax droplets in water having mean particle diameter of 8-10 microns.

The oil-in-water emulsion is then transferred to a 1-litre reactor flask and mechanically stirred for at 35° C. for 2 hours and then 60° C. for 2 hours. After this wall formation reaction, the microcapsule dispersion is cooled to room temperature and the mixture pH adjusted to 7.0 with dilute aqueous sodium hydroxide solution.

Examination of the product under a light microscope clearly revealed the presence of encapsulated wax microcapsules.

EXAMPLE 4

This example shows that the microcapsules of example 1 can be introduced at the padding stage to fix the polymeric matrix particles onto textiles.

A cotton fabric was padded with 5 gram/litre of microcapsules of Example 1 at pH 4 to 100% pick-up under four different treatment conditions ($R_0$, $R_1$, $R_2$ & $R_3$) see Table 1.

TABLE 1

Conditions for fixing Microcapsules onto cotton fabric.

| Condition | Description of Fixation |
|---|---|
| $R_0$ | No chemical treatment |
| $R_1$ | Wet, 20 g/L $MgCl_2$, 80° C., 4 hour |
| $R_2$ | Stenter, 170° C., 2 min, 20 g/L $MgCl_2$ |
| $R_3$ | Stenter, 170° C., 2 min, 20 g/L $MgCl_2$, crosslinker (Knittex FEL ® 40 g/L) |

The cotton fabrics treated under the 4 different conditions were washed 0, 1, 5, 10 and 20 times in a Wascator FOM71MP LAB at 40° C. according to the following conditions:
Detergent: 30 g IEC-Standard detergent Type A, IEC-A*.
Water: 1 litre
Washing temperature: 40° C.
Washing time: 10 minutes
Rinsing: Twice for 1 minute with each 20 litre water The carbon black marker in the core of the microcapsules was measured by Datacolor+Helios Table 2 shows the durability of the microcapsules with the different time washes.

| Application number | Application conditions (Cotton tricot) | % Retention Number of washes (40° C.) | | | |
|---|---|---|---|---|---|
| | | 1 | 5 | 10 | 20 |
| $R_0$ | No chemical treatment | 85 | 65 | 50 | 42 |
| $R_1$ | Wet, 20 g/L $MgCl_2$, 80° C., 4 hrs | 90 | 70 | 70 | 58 |
| $R_2$ | Stenter, 170° C., 2 min, 20 g/L $MgCl_2$ | 100 | 85 | 80 | 70 |
| $R_3$ | Stenter, 170° C., 2 min, 20 g/L $MgCl_2$, crosslinker (Knittex FEL ® 40 g/L) | 95 | 82 | 78 | 68 |

Application of microcapsules of Example 1 with a Carbon black marker gives high wash durabilities; Cationicity alone achieves a 30-40% 20 wash durability.

The activation of methylols via a $MgCl_2$ catalyst at 170° C. boosts the wash durability to 70%. The lack of benefit achieved by the addition of a chemical binder is shown by the similar behaviour of $R_2$ and $R_3$.

The invention claimed is:

1. A capsule, characterized in that the capsule is a microcapsule or nanocapsule having a core and a polymeric shell, which shell is characterized in that the shell has cationic and fiber-reactive groups on the outside of the shell surface, characterized in that the ratio of cationic groups to the reactive fiber groups on the shell surface is 50:1 up to 1:1, the reactive groups are methylol groups of melamine formaldehyde resin; methylol groups of methylol acrylamide; 2,4-dichloro-1,3,5-triazine (DCT); mono-chlorotriazine (MCT), wherein the triazine can be additionally substituted by one substituent chosen form the group consisting of —F, —OH, —$OC_1$-$C_4$alkyl, —$NH_2$, —NH($C_1$-$C_4$alkyl) and -N($C_1$-$C_4$alkyl)$_2$; mono-fluorotriazine, wherein the triazine can be additionally substituted by one subsitutent chosen form the group consisting of —F, —OH, —$OC_1$-$C_4$alkyl, —$NH_2$, —NH($C_1$-$C_4$alkyl) and —N($C_1$-$C_4$alkyl)$_2$, 2-sulfooxyethylsulfonyl group; 2-chloroethylsulfonyl; vinylsulfonyl group; alkoxychlorotriazine; 2-(sulfothio) ethylsulfonyl groups; trichloropyrimidine; difluorochloropyrimidine (DFCP); dichloroquinoxaline; 2,3-dichloro-chinoxaline (DCC) and 3-chloropropionamine (CPA) and the fiber reactive groups are groups which form covalent bonds with the functional groups of the fiber.

2. The capsule according to claim 1, characterized in that the core comprises an active ingredient within the polymeric shell.

3. The capsule according to claim 2 wherein the capsule further comprises a matrix polymer with the active ingredient distributed evenly throughout the matrix.

4. The capsule according to claim 1 characterized in that the size of the capsule is from 10 nm to 500 μm.

5. The capsule according to claim 1, wherein the cationic groups are quaternary ammonium groups.

6. The capsule according to claim 2, wherein the core is a solid or liquid compound.

7. The capsule according to claim 3, wherein the matrix contains secondary polymer particles that are capable of absorbing and retaining active materials.

8. The capsule according to claim 2, wherein the core contains active materials selected from UV absorbers, UV reflectors, active dye tracer materials, enzymes, detergent builders, bioactive or anti-microbial/fungal agents, antistats, drugs or pharmaceuticals, sunblock agents, dyes, pigments, colorants, scents or fragrances, fire retardant or suppressant chemicals, metallic reflector colloids, reflective particles, magnetic particles, thermochromic materials, insect repellents, heat-absorbing or -releasing phase change agents, bleach catalysts, bleach activators, emollients, fabric softeners, zeolites and activated carbon.

9. A liquid formulation comprising capsules according to claim 1.

10. A material treated with a capsule according to claim 1, wherein the fiber reactive groups form covalent bonds with functional groups of the fiber.

11. The material according to claim 10, wherein the material is selected from fibers, yarns, fabrics, textiles or webs, and paper.

12. The capsule according to claim 1, wherein the fiber reactive groups are methylol groups of a melamine formaldehyde resin or methylol groups of methylol acrylamide.

* * * * *